United States Patent Office 3,133,811
Patented May 19, 1964

3,133,811
MANGANESE DEFICIENCY-CORRECTING FERTILIZER ADDITIVE, AND THE PROCESS OF MAKING SAME
Jay Y. Welsh, Brainerd, Minn., assignor to Manganese Chemicals Corporation, Baltimore, Md., a corporation of Maryland
No Drawing. Filed Dec. 15, 1961, Ser. No. 159,777
3 Claims. (Cl. 71—63)

This invention relates to the correction of manganese deficiency in plants grown in soils lacking, or poor in, manganese in a form available to the plants. More particularly, the invention is concerned with the provision of an improved "additive" for a commercial mineral (N–P–K) mixed fertilizer. The invention includes both process and product aspects.

In the commercial fertilizer art it has been considered to be advantageous that a mixed fertilizer include a source of manganese in a form eventually assimiliable by the plants to be "fed" by such commercial fertilizer. Thus, it has been proposed to add (to commercial fertilizers) a more or less water-soluble manganese sulphate. However, the high solubility of this compound has tended to militate against relying upon it, because it leached out of soil rather quickly (and hence exerted its intended function only comparatively briefly).

It has been proposed, also, to add to acid soils manganous oxide (MnO) as a source of available manganese for assimilation by the plants grown thereon. It had been supposed that the higher oxide of manganese, manganese dioxide ($MnO_2$) was of substantially no value as a source of available manganese because of the practical insolubility of $MnO_2$ in water.

It has now been found, however, that $NnO_2$ in the soil is very slowly assimilable and hence exerts a slight but very long-continued effect in counteracting manganese deficiency.

According to the present invention, an improved manganese-yielding "additive" composition for the above-stated use in a commercial mixed fertilizer is a mixture of a plurality of manganese-containing compounds yielding manganese in varying degrees of plant assimilability, to wit, a reaction mixture including manganese sulphate ($MnSO_4$) for "immediate" effect, manganous oxide for relatively prolonged effect, and manganese dioxide for relatively very long-continued effect in the soil.

Specifically, the "additive" of the present invention is the product produced by reacting $MnO_2$ with a sulphur at a controlled elevated temperature of up to but not exceeding about 675° C. In this reaction mixture the manganese-containing components consist essentially of unreacted $MnO_2$ from about 9 to about 13 percent, $MnSO_4$ from about 35 to about 50% and the balance substantially all MnO.

In carrying out the preparation of the novel mixture of the invention, a preferred method involves (a) mixing ground manganese dioxide ore with a substantially stoichiometric equivalent amount of sulphur under conditions to yield a substantial mass of reasonably homogeneous mixture, (b) initiating reaction by applying heat to a selected spot or area of the mass—the locally supplied heat being at a sufficiently elevated temperature, e.g., about 450° C.—to initiate chemical reaction between $MnO_2$ and sulphur at such selected spot, (c) allowing the reaction to propagate throughout the mass of mixture, (d) cooling the reaction products and sieving the latter, the steps "b," "c" and "d" being effected under conditions of practical exclusion of free oxygen-containing gas (e.g., of air).

There are, however, some limiting features imposed by thermodynamic considerations having to do with the peak reaction temperature developed. Also the reaction must be carried out in such a way that the reactants have time and opportunity to react completely or at least come close to complete reaction. The desired reaction is:

$$3MnO_2 + S \rightarrow MnSO_4 + 2MnO \qquad (1)$$

This is also the reaction predicted by free energy calculations up to about 675° C. Above this latter temperature, the $SO_2$ pressure exceeds one atmosphere, and the following reaction is predicted:

$$3MnO_2 + S \rightarrow Mn_3O_4 + SO_2 \qquad (2)$$

Thus, if one were to employ near-stoichiometric ratios of ore and sulphur the reactions must be carried out at a temperature below 675° C. The hurdle, here, is that the heat of reaction (1) theoretically will raise the temperature to 1100°–1200° C. Water and inerts in the ore, plus a little excess sulphur, drop the peak temperature somewhat; nevertheless, a problem still remains and one cannot hope to carry out the desired reaction in a large bed of mixture without exceeding the limiting temperature of said reaction.

The over-all heat of reaction can be lowered by substituting $Mn_3O_4$ for part of the $MnO_2$ of the reaction mixture.

Aside from this relatively economically undesirable mode of meeting the problem, one can meet the problem by carrying out the reaction in a relatively small body of reaction mixture, or—more exactly stated—in a body of reaction mixture exhibiting a relatively high ratio of area to mass.

Two other problems are solved by causing the reaction to propagate downward through the bed. If the reaction propagates upward, as one might like for a continuous process, the water in the ore accumulates as condensate above the reaction zone ultimately producing a "mud" which blocks and interferes generally with propagation of the reaction. Further, there is a reaction inefficiency in the primary reaction zone due to the volatilization of both sulphur and $SO_2$. When, however, the reaction propagates downward through the bed, sulphur vapors and $SO_2$ vapors from the primary reaction zone move upward through the hot bed of incompletely reacted manganese oxides and the reaction continues toward completion. But when the reaction propagates upward, the reactants lose this "second chance"; also the moist $SO_2$ moving upward tends to react with $MnO_2$ to produce a premature $MnSO_4$ coating on the ore particles which coating tends to block further reaction.

According to the procedural aspect of the present invention, the reaction mixture is contained in long narrow containers conducive to substantial dissipation of heat (i.e., reaction heat) through the side walls of the container. Thus, when using a reaction mixture in which the $MnO_2$ and the S initially are present in substantially stoichiometric ratio, the width of a container for "ideal" heat control is of the order of 9 to 10 inches.

A practical production reaction container is a structural group of 5 unit containers each unit being 9" wide x 4' long x 4½' deep. The overall dimensions are, then, 4' x 4' x 4½'. This set-up holds 2½ to 3 tons of product. Not only does this structure permit control of the peak reaction temperature but it permits the product to be cooled rapidly either by air currents or by circulating water in indirect heat-exchanging relationship with the container side walls. If each unit is tapered slightly the product can be dumped without difficulty (there may be a very slight blocking).

The peak reaction temperature in such a container can be controlled at about 600° C. The reaction is initiated at the upper surface of the body of mixtxure by any suitable device (even infra red heat lamps), that will produce and maintain a temperature of about 450° C. Atmospheric control is accomplished either by covers or by loose insulation placed on the top after the reaction is started.

Once initiated, the reaction propagates downward at the rate of some 3 or 4 inches per hour. Initially, both sulphur and $SO_2$ fumes are evolved but when the reaction moves deep into the bed the fumes almost cease.

*Example*

Mixture: 7:15 parts by wt. of $MnO_2$ ore to 1 part by wt. of sulphur.

$MnO_2$ ore analysis:

| | Percent |
|---|---|
| Mn | 55.6 |
| $MnO_2$ | 80.8 |
| $SiO_2$ | 2.86 |
| $H_2O$ | 3.00 |

Reaction container: As described above (peak temperature and propagation rate as described).

Product analysis (total):

| | Percent |
|---|---|
| Mn | 51.3 |
| $MnSO_4$ | 44.6 |
| MnO | 34.6 |
| $MnO_2$ | 12.3 |

The proportion of the reactants in the above example allows some excess of sulphur to improve the MnO content somewhat, although a stoichiometric ratio would not raise the $MnO_2$ value by more than 3 or 4%.

Referring to the above "product analysis," is is to be noticed that the ratio of oxides of manganese to $MnSO_4$ therein can be adjusted upwardly by purposefully rendering the reaction less nearly complete, but it has been found desirable to restrict the amount of unconverted $MnO_2$ within the range of from about 12.5% to about 10.0%.

After completion (or substantial completion) of the reaction, cooling, and seiving, the reaction product is— or may be—merely admixed with any conventional fertilizer composition, e.g., with a conventional "5-10-5" type of "commercial fertilizer."

My tests have not continued long enough to support an exact statement as to the "longevity" of the manganese—of my novel composition—in the soil, but conservative extrapolation of the findings of the tests so far observed indicate the probability that significant concentrations of assimilable manganese will persist in the soil for at least ten years.

I claim:

1. A mineral deficiency-correcting additive for use in a commercial fertilizer, consisting essentially of a mixture of manganese sulphate, manganous oxide and manganese dioxide in the following proportions by weight:

| | |
|---|---|
| $MnSO_4$ | From about 35 to about 50%. |
| $MnO_2$ | From about 9 to about 13%. |
| MnO | Balance. |

2. Process which comprises forming a homogeneous mixture of manganese dioxide and sulphur in substantially stoichiometric proportions, locally igniting a mass of the mixture, and controlling the temperature of the mixture undergoing reaction to from about 450° C. to not exceeding 675° C., the reaction being effected under conditions of practical exclusion of air, to the production of a reaction mixture in which the manganese-containing components consist essentially of unreacted $MnO_2$ from about 9 to about 13% by weight, $MnSO_4$ from about 35 to about 50%, and the balance substantially all MnO.

3. The process defined in claim 2, in which the manganese dioxide starting material is in the form of finely divided manganese dioxide ore.

References Cited in the file of this patent

UNITED STATES PATENTS

| 2,804,382 | Nikitin et al. | Aug. 27, 1957 |
| 3,057,712 | Nikitin et al. | Oct. 9, 1962 |

FOREIGN PATENTS

| 561,207 | Canada | Aug. 5, 1958 |